US012590733B2

(12) United States Patent
Janssen

(10) Patent No.: US 12,590,733 B2
(45) Date of Patent: Mar. 31, 2026

(54) POLYCARBONATE PARABOLIC TROUGH SOLAR CONCENTRATOR

(71) Applicant: Matthew A. Janssen, Sandpoint, ID (US)

(72) Inventor: Matthew A. Janssen, Sandpoint, ID (US)

( * ) Notice: Subject to any disclaimer, the term of this patent is extended or adjusted under 35 U.S.C. 154(b) by 21 days.

(21) Appl. No.: 17/761,774

(22) PCT Filed: Sep. 24, 2020

(86) PCT No.: PCT/US2020/052541
§ 371 (c)(1),
(2) Date: Mar. 18, 2022

(87) PCT Pub. No.: WO2021/062026
PCT Pub. Date: Apr. 1, 2021

(65) Prior Publication Data
US 2022/0333824 A1 Oct. 20, 2022

Related U.S. Application Data

(60) Provisional application No. 62/904,964, filed on Sep. 24, 2019.

(51) Int. Cl.
*F24S 23/70* (2018.01)
*F24S 23/74* (2018.01)

(52) U.S. Cl.
CPC .............. *F24S 23/82* (2018.05); *F24S 23/745* (2018.05)

(58) Field of Classification Search
None
See application file for complete search history.

(56) References Cited

U.S. PATENT DOCUMENTS

| | | | | |
|---|---|---|---|---|
| 4,210,463 A | * | 7/1980 | Escher | ................ H01L 31/0547 |
| | | | | 136/246 |
| 6,119,986 A | * | 9/2000 | Stribling, Jr. | .......... B64G 1/222 |
| | | | | 244/172.8 |
| 2008/0083405 A1 | * | 4/2008 | Kimura | ................. F24S 23/745 |
| | | | | 126/690 |
| 2012/0266938 A1 | * | 10/2012 | Goei | ....................... F24S 40/55 |
| | | | | 136/246 |

OTHER PUBLICATIONS

Zou et al., "A detailed study on the effects of sunshape and incident angle on the optical performance of parabolic trough solar collectors" (Year: 2017).*

* cited by examiner

*Primary Examiner* — Jason Lau
(74) *Attorney, Agent, or Firm* — Mitchell J.W. Vap

(57) ABSTRACT

The parabolic trough solar concentrator described within is sized for shipping in containers and mounting on existing structures without requiring specialized labor or equipment. Besides achieving a proximity to the thermal load not previously achievable economically and preserving precious land, the concentrator array shelters the area below from the sun reducing its energy requirement for cooling and making it more inhabitable when cooling is not provided. As the troughs are generally mounted on an incline on roof structures, they can provide for rainwater collection.

19 Claims, 12 Drawing Sheets

FIG. 7

POLYCARBONATE PARABOLIC TROUGH SOLAR CONCENTRATOR

CROSS-REFERENCE TO RELATED APPLICATIONS

This application claims priority to U.S. Provisional Application No. 62/904,964, filed Sep. 24, 2019, the disclosures of which are hereby incorporated by reference in their entirety to provide continuity of disclosure.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Parabolic trough solar concentrators are well known. The trough shape is a truncated portion of a parabolic curve usually defined by a rim angle or the ratio of focal length to aperture diameter (f/D.) The size of the trough is then defined by a linear dimension such as aperture diameter (D) or focal length (f), as parabolic troughs with the same rim angles are geometrically similar. A trough with a small rim angle is relatively flat and the focal length is long compared to its aperture diameter. There are performance and construction cost advantages which manipulate the ratios to the desired effect. Larger, contemporary designs tend to have a rim angle of about 80 degrees where smaller or older designs may have a rim angle of 90 degrees or more. Very small or very large rim angles imply long distances between the reflector and the focus which amplifies radiation losses to the absorber tube and geometrical errors. While a 120 degree rim angle has the shortest average reflector-to-focus length, the ratio of reflector arc length per amount of aperture gained is much higher at greater rim angles so that one seldom sees a utility scale, 15' or larger trough with a rim angle much greater than 85 degrees or an industrial scale, smaller aperture trough with a rim angle much greater than 100 degrees. A reason for the discrepancy is that in larger troughs, the capital cost per square foot of reflective surface is generally higher and the unit cost per trough is generally lower than for smaller troughs. Also, there is not a mandate to place the center of gravity close to the focus on large troughs which do not pivot at the focus. Because of the capital cost of forming precise parabolic reflector surfaces and support structures to hold them, there is a general economy per square foot of reflective area for troughs of large aperture.

The Geometric Concentration Ratio (CRg) is the area of the aperture (Aa) divided by the area of the absorber tube (Ar). Thermal losses increase with larger absorber tube diameters. The temperature that the absorber tube can achieve is the point where the absorbed thermal energy equals the convective and radiant heat losses. It is therefore desirable to have a ratio up to the optical limit—the smallest absorber tube for a given aperture that will capture the majority of the rays from the sun. In almost all cases, however, troughs are connected in series in long strings to reduce actuator requirements and rotary joints to the absorber tubes. Whether the absorber tubes carry thermal oil, water, or other substance, the pumping requirements of such a monotube boiler or heater system relative to its thermal output is a major concern. Existing monotube systems become less efficient when they are made smaller because of the flow resistance of small monotube piping systems. As such, one will rarely encounter an absorber tube outside diameter smaller than 1", with 2.75" being typical. The concentration ratios of smaller troughs are then typically less which then limits the maximum achievable temperature, but preserves coefficient of flow through the absorber tubes. Low pressure steam may be made with concentration ratios of 40, whereas designs suitable for making higher pressure, higher temperature steam for a typical steam-driven prime mover will have concentration ratios of 65 and may exceed 85.

As the Earth's axis is tilted 23.5 degrees, the sun only strikes down directly on the Earth at 23.5 degrees of latitude North of the equator. Parabolic trough solar concentrators are typically mounted with the trough rotating axis on a horizontal plane. This increases the distance rays must travel from the reflector to the receiver. Presently deployed troughs typically have an aperture of 20' or more and a set of troughs extends 150' or more from the actuator which focuses the reflector. As such, a significant structure is necessary to support the reflector surface, transmit the torque of the actuator, and resist environmental conditions such as wind in excess of 75 miles per hour. This significant structure results in the center of gravity of the assembly being far enough below the focus that it is generally more practical for the pivot to be below the reflector surface and thus the absorber is moving as the trough tracks the sun. Large troughs of this type are typically used for generating steam solely for electrical power generation. Such trough systems must be mounted on pylons supported by pilings or concrete foundations directly above ground and erected piece by piece using highly skilled labor and heavy machinery. Such trough systems generally cannot utilize existing structures due to the size of the arrays and structural loads at issue. This results in dedicating large tracts of land to this exclusive purpose which also may displace a fragile ecosystem. As such, the location of a large array is often isolated from industry, which requires significant transmission infrastructure to transmit any energy generated. Since it is uneconomic to place large array systems on commercially valuable land, there is no opportunity for electricity generation with thermal cogeneration of the large volume of steam prime mover exhaust and thus the thermal efficiency for the system is low.

Therefore, there is a significant advantage to a trough which incorporates as much of the necessary structure into the body of the trough to increase the accuracy of the reflective surface and reduce the amount and quality of resources needed to install an array.

For example, the Solarlite SL 4600 uses a 15' aperture trough of composite construction, a rim angle of 87.6 degrees, f/D of 0.26, and CRg of 66. The trough is broken up into a plurality of individual boxed-in parabolic segments with foam cores and a thin glass mirror applied on top. The structural strength of the trough allows for the metal structure supporting it to be reduced as compared to typical designs and the resources needed to erect the array are therefore reduced. The optical quality of the troughs is higher so that a smaller reflective surface is required for a specified steam generation capacity. These qualities make the design more suitable for siting near industrial users for thermal cogeneration which achieves a higher efficiency than using the steam solely for electrical generation. However, even with the reduced structure required, a 15' aperture trough of this design could not be erected without significant skilled labor and machinery.

The Soliterm PTC line of troughs are robotically-fabri-cated aluminum frame and reflector construction. Soliterm's PTC 1100 (approx. 43" aperture) and PTC 1800 (approx. 71" aperture, f/D=0.43) troughs are smaller and lighter weight to the extent where they can be mounted on top of a purpose-built structure with some economics, as well as integrated into purpose-built buildings which can withstand the weight of the array and the forces the environment imposes on the structure from interaction with the array. However, skilled labor is still required for deployment of the system. Furthermore, the system is not capable of complete packaging for rapid shipment and deployment to remote areas and could not be manufactured or erected without significant skilled labor and machinery.

The George Plhak solar parabolic trough concentrator is an approximately 19.5" aperture by 6' to 8' long trough. It primarily uses wood construction and thin sheets of reflec-tive material gripped along the two long edges in a ribbed parabolic frame. Screws joining the side channels to the ribs are tightened to snug the sheet into the frame. This forms a rigid parabolic trough. The trough design has a focus of approximately 4" and a rim angle of approximately 103 degrees (f/D=approx 0.2) which brings the center of gravity of the trough sufficiently close to the focus that the pivot is at the focus. Minimal actuator force is required, and the absorber tube is fixed. The end plates which support the trough use turntable "Lazy Susan" bearings where the absorber passes through the end plates and bearings. Plhak references George Treadwell of Sandia Lab's 1976 paper, "Design Considerations for Parabolic Cylindrical Solar Col-lectors." The Plhak collector is presented as plans for the experimenter and has a number of inherent deficiencies. It is difficult to get the design to support a concentration ratio above 37 even with a metallic frame structure because the thin reflector sheet is deflected by the ribs and fastening. The turntable bearings are designed to work with compressive, not axial, load and therefore the framework holding the trough has to put the trough in compression to make the bearings function freely and smoothly. Furthermore, a sat-isfactory means is not provided for holding the absorber tubes. The Plhak solar parabolic trough concentrator is designed to be mounted on an incline as a single length trough and have adjacent troughs rotate at the same angle using linkage known to the art that are similar to a Fresnel collector or Roman blinds.

Solar thermal energy is generally greatest near the equa-tor. Many areas are remote, like islands, or have limited capabilities and skilled workers to build field-erected arrays. In more developed areas, resources and capabilities of workers are improved but generally not to the extent to be able to erect parabolic trough solar concentrator arrays of the known types. There is also an abundance of existing struc-tures used for all types of purposes where shading its roof from the sun is desirable. Furthermore, fresh-water collec-tion from rainfall is desirable in many situations.

Due to the inherent issues with the prior art described above, there is a need for a low cost parabolic trough solar concentrator that can generate high pressure and temperature steam for electricity generation and complimentary thermal processes that can be packaged for rapid transportation and deployment. As such, the parabolic trough solar concentrator described within is sized for shipping flat in containers and each individual component is light enough to be handled manually.

There is a need for a parabolic trough solar concentrator small enough to permit an array to be mounted on platforms, barges, and other industrial sites.

There is a need for a parabolic trough solar concentrator of a practical size that it can be mounted high enough that shelter from the sun is provided to people underneath.

There is a need for a parabolic trough solar concentrator that provides for fresh-water collection from rainwater.

The parabolic trough solar concentrator described herein resolves the aforementioned problems with known parabolic trough solar concentrators.

BRIEF SUMMARY OF THE INVENTION

The parabolic trough solar concentrator described within is sized for shipping in containers and mounting on existing structures without requiring specialized labor or equipment. Besides achieving a proximity to the thermal load not previously achievable economically and preserving precious land, the concentrator array shelters the area below from the sun reducing its energy requirement for cooling and making it more inhabitable when cooling is not provided. As the troughs are generally mounted on an incline on roof struc-tures, they can provide for rainwater collection.

A principle object of the parabolic trough solar concen-trator design is to incorporate the structural strength neces-sary into the collector body, bulkhead, and longitudinal rails to eliminate common needs of parabolic troughs including ribs, space frames, and torque tubes.

A further principle object of the parabolic trough solar concentrator design is to provide a collector body and reflective surface that ships flat prior to assembly and is compact in its packed state to allow transport to remote locations.

A further object of the parabolic trough solar concentrator design is to provide a trough design that does not require unique or expensive tooling to manufacture or skilled labor and machinery to erect in the field.

A further object of my parabolic trough solar concentrator design is to provide shelter from the sun on new or existing structures.

A still further object of my parabolic trough design is to provide a parabolic trough that is small enough that a series of them can be raised on one end to minimize the solar incidence angle loss due to latitude without creating exces-sive head pressure in the absorber tube. This may allow a direct steam generation configuration with natural circula-tion.

A still further object of my parabolic trough solar con-centrator design is to provide for rainwater collection.

BRIEF DESCRIPTION OF THE SEVERAL VIEWS OF THE DRAWINGS

Figure 7:
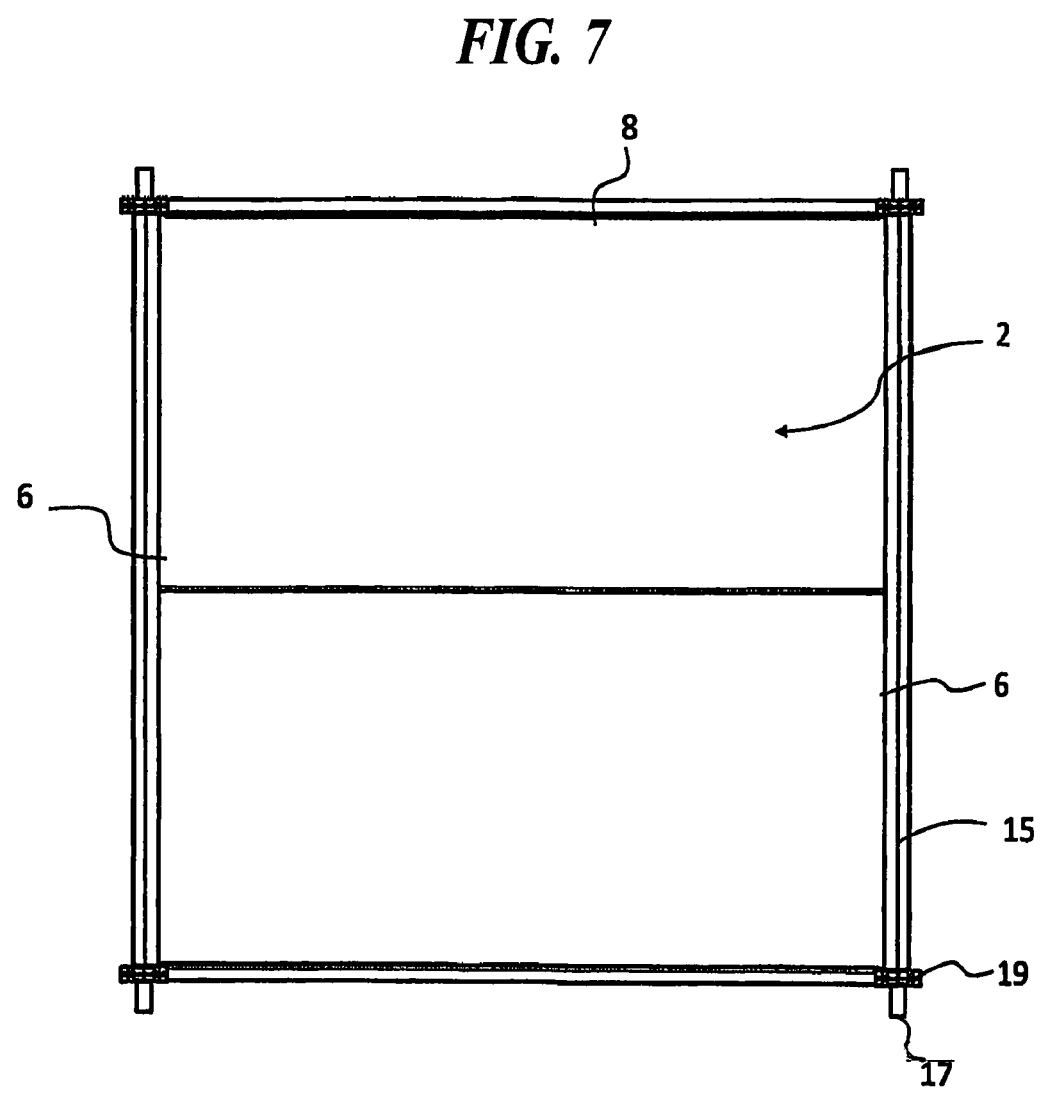

FIG. 7 Top view of a preferred embodiment of the polycarbonate parabolic trough without struts and torque tube.

DETAILED DESCRIPTION OF THE INVENTION

Figure 1:
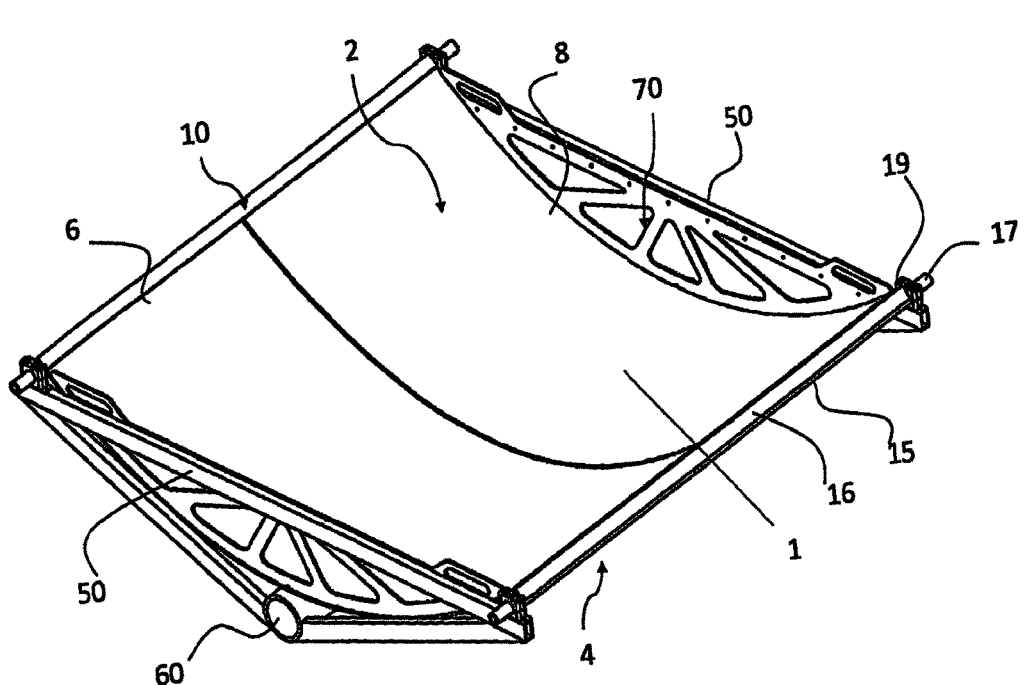
FIG. 1 Perspective view of an embodiment of the poly-carbonate parabolic trough solar collector with struts and torque tube.
Figure 2:
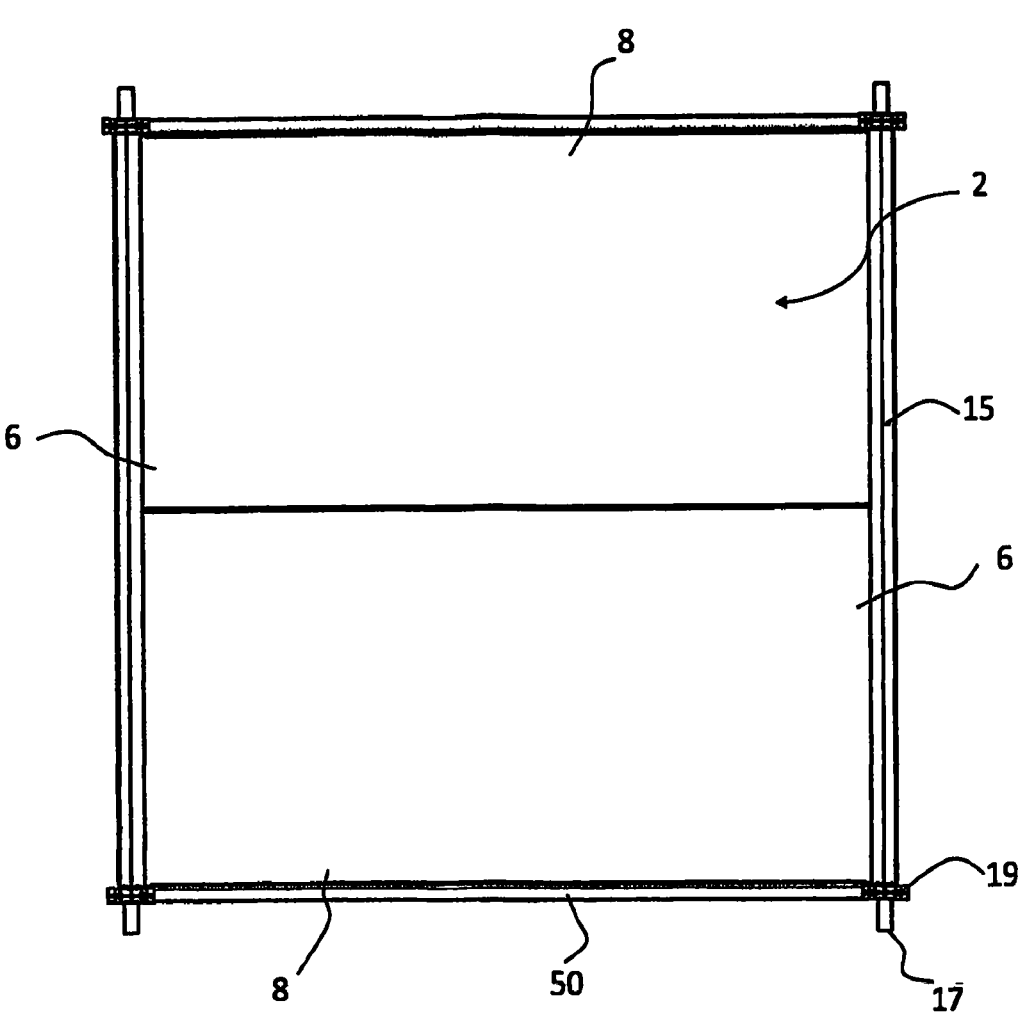
FIG. 2 Top view of an embodiment of the polycarbonate parabolic trough with struts and torque tube.
Figure 6:
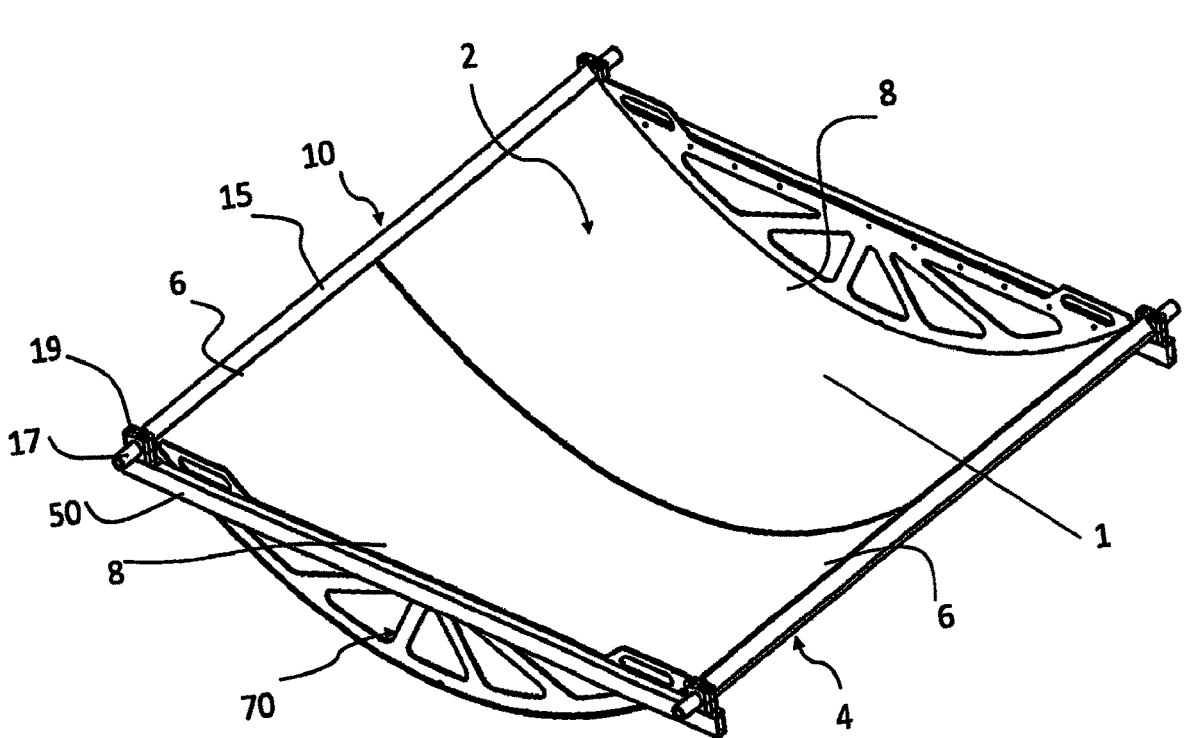
FIG. 6 Perspective view of a preferred embodiment of the polycarbonate parabolic trough solar collector without struts and torque tube.

Referring now to the drawings and more particularly FIGS. 1 and 6, preferred embodiments of a parabolic trough solar collector are shown. The parabolic trough solar collector is generally comprised of a body 1, frame 10, and bulkhead 70. The body 1 of the trough is comprised of a top surface 2, a bottom surface 4, opposing ends 6 and opposing longitudinal sides 8, wherein the shape of said body 1 is generally rectangular. The purpose of said body 1 is to provide a parabolic reflective surface to concentrate solar energy onto an absorber tube.

Figure 12:
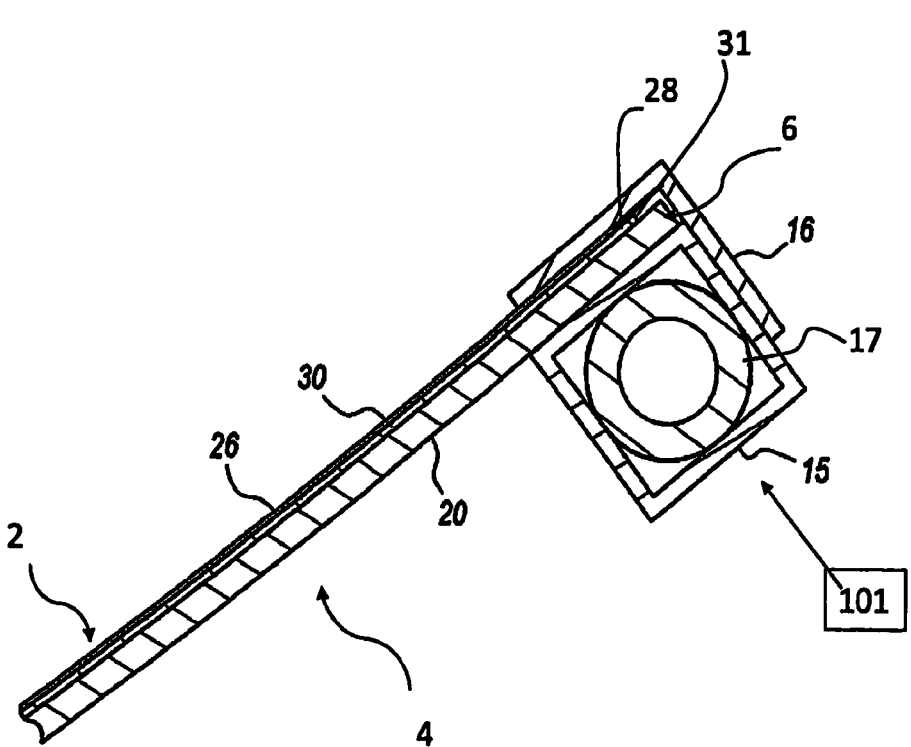
FIG. 12 Blow up cross-section view of FIGS. 3 and 8 corner of end view.

With reference more particularly to FIG. 12, the body 1 of the trough is preferably comprised of a sheet of flexible material, preferably an aluminum sheet 30 placed on top of a multi-wall polycarbonate sheet 20. The aluminum sheet 30 ends 31 short of the end 6 of said polycarbonate sheet 20. An adhesive-backed flexible silvered polymer mirror reflective film 26, such as Reflectech, is laminated to the aluminum sheet 30. The aluminum sheet 30 and multi-wall polycarbonate sheet 20 are flat sheets elastically bent into a parabolic curvature 100 (FIGS. 3 and 8) by applying a set of end moments 101 and forces to the longitudinal rails 15 to which polycarbonate sheet 20 and aluminum sheet 30 are held to by angle 16 in addition to fasteners or pins to form a channel-shaped, indexed fastening. Curving the multi-wall polycarbonate sheet 20 up to its rated minimum cold-bent radius induces internal stresses increasing its strength and rigidity, similar to pre-stressed concrete elements. Construction in this manner achieves capability for mass production, while surface slope errors can be held within tolerances required for most industrial heat processes including cogeneration. The aluminum sheet 30 ends 31 are cut sufficiently short of the longitudinal rails 15 and angle 16 such that end moments 101 and forces are not imposed upon the aluminum sheet 30. The aluminum sheet 30 is lightly clamped to the multi-wall polycarbonate sheet 20 by angle 16 and edge tape 28 is applied on the top surface 2 end 6, spanning over the top of the reflective layer 26 edge, aluminum sheet 30, end 31, and multi-wall sheet 20 end 6.

Figure 3:
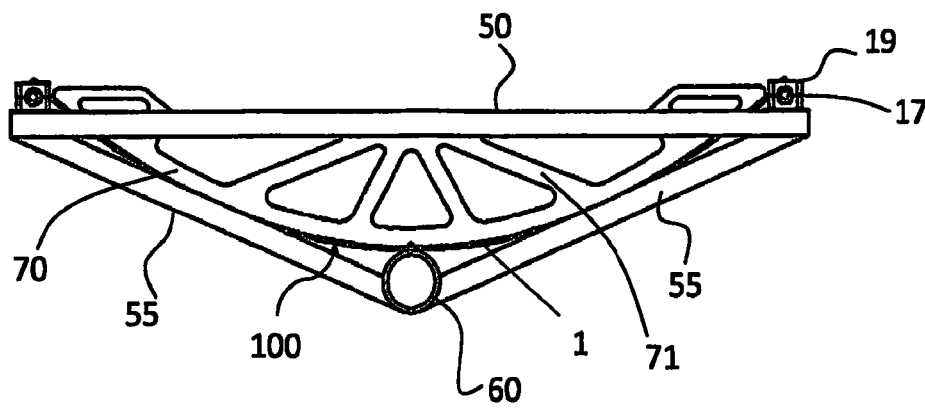
FIG. 3 End view of an embodiment of the polycarbonate parabolic trough with struts and torque tube.
Figure 4:
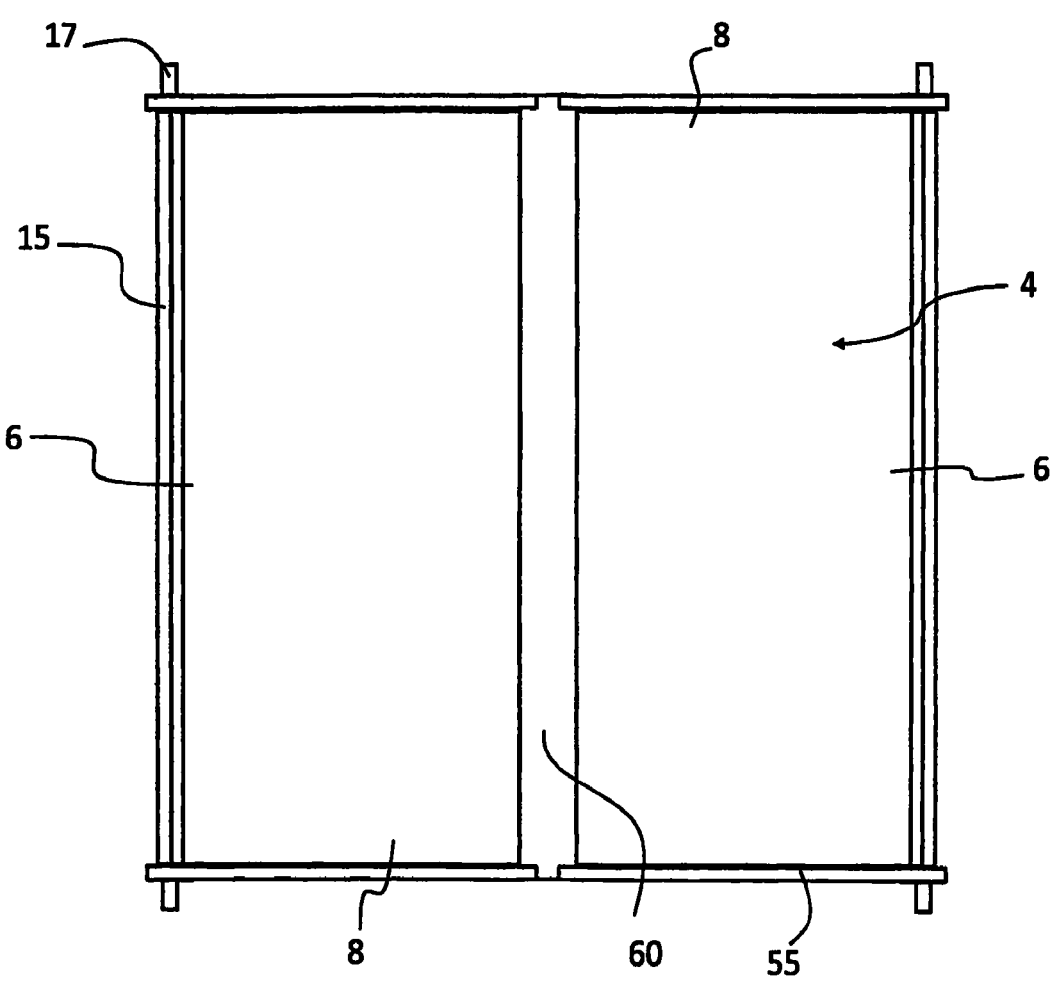
FIG. 4 Bottom view of an embodiment of the polycarbonate parabolic trough with struts and torque tube.
Figure 5:
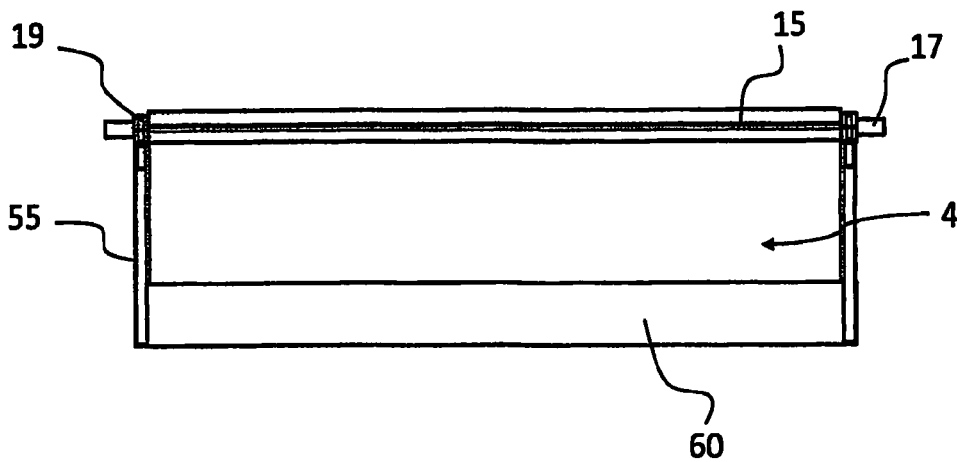
FIG. 5 Longitudinal side view of the end of an embodiment of the polycarbonate parabolic trough with struts and torque tube.
Figure 8:
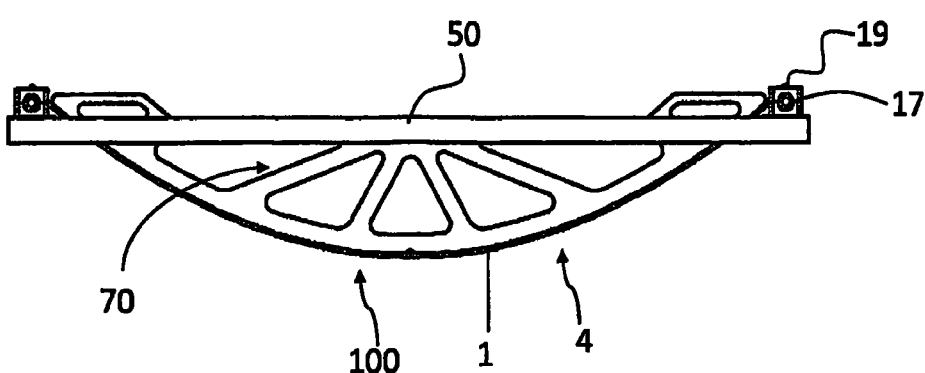
FIG. 8 End view of a preferred embodiment of the polycarbonate parabolic trough without struts and torque tube.
Figure 9:
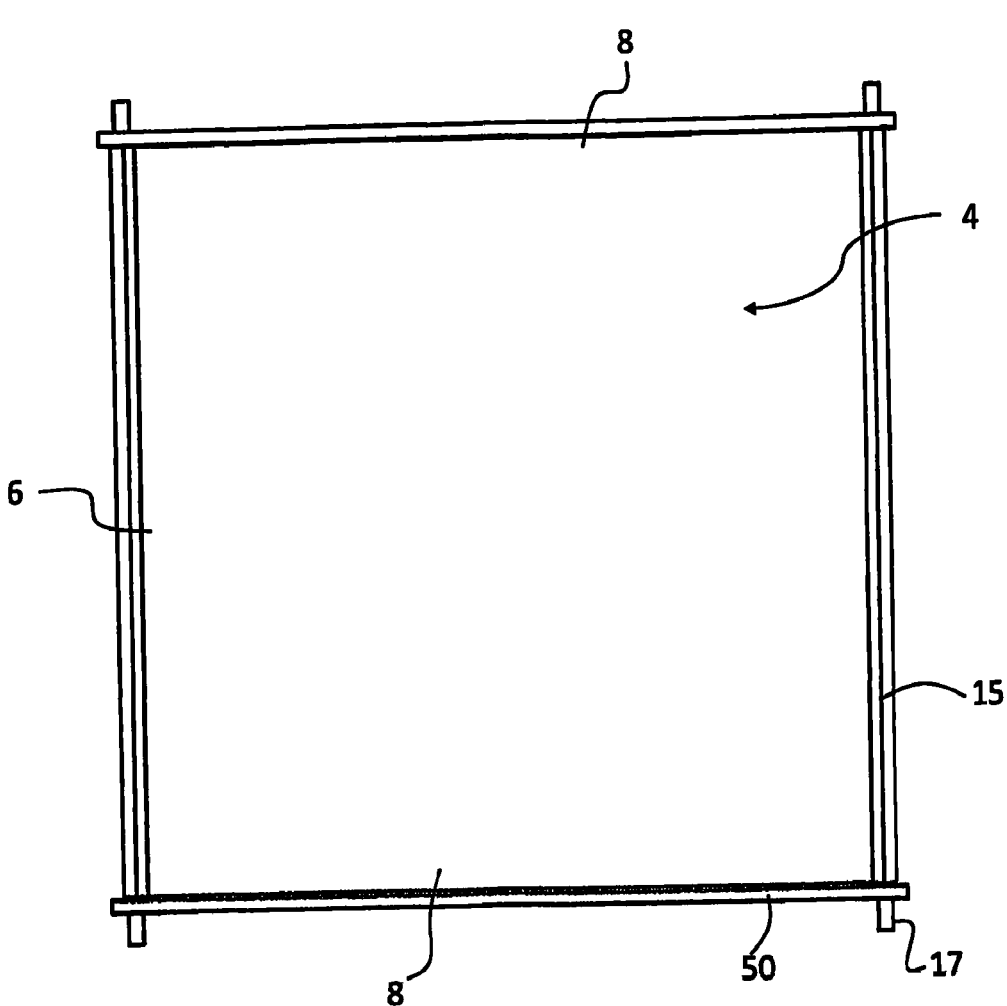
FIG. 9 Bottom view of a preferred embodiment of the polycarbonate parabolic trough without struts and torque tube.
Figure 10:
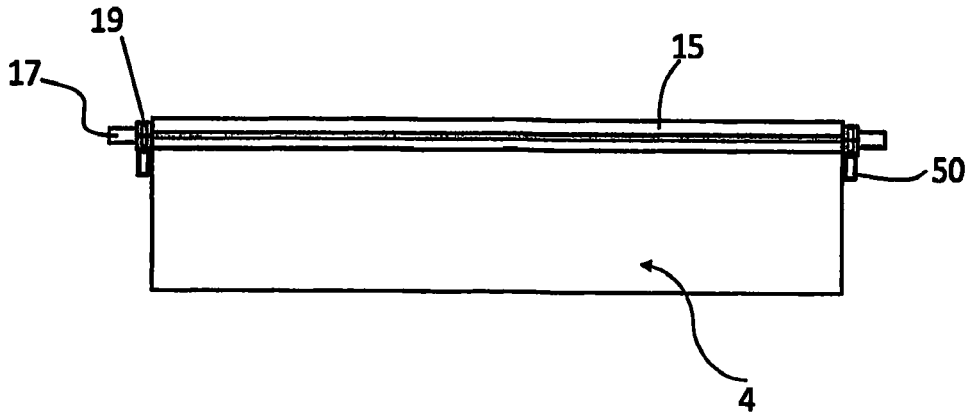
FIG. 10 Longitudinal side view of the end of a preferred embodiment of the polycarbonate parabolic trough without struts and torque tube.
Figure 11:
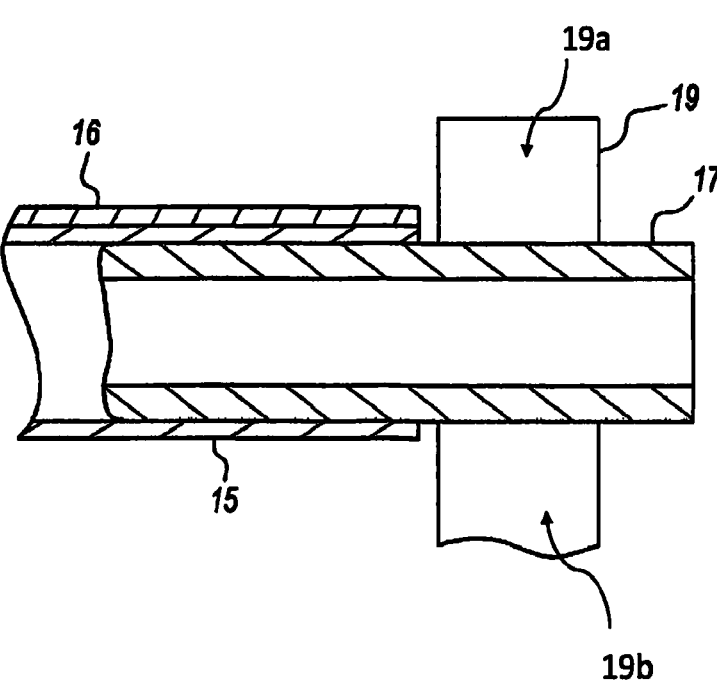
FIG. 11 Blow up cross-section view of FIGS. 5 and 10 longitudinal side view of end.

With reference more particularly to FIGS. 3 and 8, a longitudinal side 8 bulkhead 70 for a trough, is connected to the frame 10 by longitudinal side 8 chord rail 50, where the chord rail 50 passes below a focus with an f/D of 0.32 is shown. Said bulkhead is comprised of a plurality of spokes 71 to increase strength of the bulkhead 70, but still allow light to pass through the bulkhead 70 to the trough body 1 top surface 2. The chord rail 50 functions to provide frame 10 support to the body 1 longitudinal sides 8 and to act as a connection point for said bulkhead 70. The chord rail 50 also accommodates mounting hardware for an absorber tube, which is mounted within the specified focus. Those familiar in the art will recognize that many mounting means could be utilized for mounting an absorber tube to said chord rail 50, including but not limited to clamps, brackets, angles, pylons, etc. Forces which create torsion on the trough are resisted by the trough body 1 and frame 10. Once assembled, the trough frame 10 is fastened by rotational means to a framework which positions and secures the assembled trough. Those familiar with the art will recognize that any framework construction means could be used to secure and position the assembled trough. Preferably, means that utilize pre-cut materials with simple, easy to find fasteners, or quick-connect components would further the object of the invention of simple construction and deployment. The trough's pivot is located along the axis of symmetry above or below the chord rail 50 such that the mass above and below the pivot of the trough is fairly balanced as it tracks the sun, so torsion is normally low and the accuracy of the trough geometry sufficient for industrial heat requirements including cogeneration in normal environmental conditions with the minimum framework structure.

The bulkhead 70 is fastened to the chord rail 50. The function of the bulkhead 70 is to apply a light downward load on the top surface 2 which increases the conformance of the body 1 to a parabolic curvature 100, particularly when the axis of symmetry is not in-line with the center of gravity, such as when the trough is aligned with morning or afternoon sun.

With further reference to FIGS. 3 and 8, the bulkhead 70 attachment to the chord rail 50 and the chord rail 50 attachment to tube clamps 19 is accomplished with standard connection means such as nuts, bolts, and clamps to minimize the need for specialized tools and skilled labor. Those skilled in the art will appreciate that any connection means could be utilized to facilitate assembly of the various embodiments, including but not limited to snap lock means, cam-lock means, ties, etc. FIG. 3 demonstrates a preferred embodiment where said frame 10 is further comprised of a longitudinal torque tube 60 connected to said chord rail 50 by diagonal struts 55. Said torque tube 60 and diagonal struts 55 function to add increased rigidity to said frame 10 in locations where high winds are prevailing. In areas not prone to high winds, the embodiment shown in FIG. 8 without said torque tube and struts is preferred due to the decreased weight, packaged size, and decreased assembly burden.

Specific examples of the embodiments disclosed herein are set forth below.

Trough Structure.

The preferred embodiment of the parabolic trough solar concentrator is comprised of a focus of 20", a functional aperture of approximately 62 inches, and f/D of approximately 0.32, and a length of approximately 60 inches. The top surface 2 of the trough body 1 accommodates a reflective layer 26 which is comprised of an adhesive backed reflective film, laminated to an aluminum sheet 30, where reflective film edge tape 28 or liquid edge sealer is used to seal said reflective layer 26 and aluminum sheet 30 to a multi-wall polycarbonate sheet 20.

The trough body 1 can be scaled-up from an approximately 5' aperture using 6 mm twin wall polycarbonate sheet 20 to an approximately geometrically similar trough exceeding 20' aperture using a 16 mm triple wall polycarbonate sheet 20 while still retaining the desired characteristics. Maintaining the CRg between 60 to 95, one can see that the preferred embodiment provides a CRg of approximately 70 with an absorber diameter of 0.840" OD. This corresponds to common ½" NPT black steel pipe, which is the smallest practical absorber tube size. Laser intercept testing shows that for a trough with an approximately square aperture of the described construction, the CRg at the middle of the reflector will degrade from a CRg of 76 to a CRg of 62, with gradual intercept losses from the rim inboard as the middle of the trough is approached. The minimum bend radius of 16 mm triple wall polycarbonate is approximately 138" which would allow a parabolic trough with as small a focus as 69", and approximately geometrically similar troughs to the preferred embodiment that will provide CRg's between 60 and 95 with commercially available utility grade 2.75", 3.15", and 3.54 receivers, commonly known as Heat Collector Elements (HCE's) such as the Rioglass PTR series. As the trough design is scaled-up, the reflector sheet thickness may be increased to approach 0.050" in large designs which will aid in its resistance to damage from hail and other impacts.

Trough Construction

The preferred method of manufacture is to cut the frame 10 components to length and drill them for fasteners. Frame components are generally comprised of chord rails 50, bulkheads 70, longitudinal rails 15 with interior rail tubes 17, tube clamps 19, and angles 16 as shown in FIGS. 8 and 12. If the troughs are to be deployed in an area with high winds, said frame 10 is further comprised of struts 55 and longitudinal torque tubes 60 to increase rigidity of said frame 10 as shown in FIG. 3. Finished aluminum sheets 20 and polycarbonate sheets 30 are pre-cut for assembly on-site. All components are pre-drilled to achieve the desired shape, geometry, and pre-loading as specified herein. Furthermore, pre-drilling of all components greatly simplifies assembly in the field.

The multi-wall polycarbonate sheet 20 is cut to a width of approximately 60" and a length of approximately 72". The aluminum sheet 30 of 0.032" thickness, is cut to a width of 59.5" to match the width of the reflective film and a shorter length (such as 71.5"). The reflective layer 26 film is applied to a top surface of the aluminum sheet 30 by a graphics roll laminator prior to packaging and shipment, from one opposing end 6 to the other opposing end 6 according to the specifications of the film. Typical graphics roll laminators, such as those made by Royal Sovereign, can achieve very good results, however, industrial-grade laminators at dedicated facilities may improve quality and have a better long-term availability rate for producing large volumes of troughs.

Following installation of a first end of the multi-wall polycarbonate sheet 20 and aluminum sheet 30, with laminated reflective layer 26 onto the top surface of a first longitudinal rail 15 and loosely clamping with angle 16 and locating the sheets with pins or fasteners, end tubes 17 are placed in tube clamps 19 of one opposing end 6, where the bottom portions 19a of said tube clamps 19 are attached to the top surface of said chord rail 50 and the top portions 19b of the tube clamps 19 are installed loose enough to allow the longitudinal rail 15 to rotate freely. The second end of the multi-wall polycarbonate sheet 20 and aluminum sheet 30 with laminated reflective layer 26 are placed on the second opposing end 6 longitudinal rail 15 and loosely clamped by its angle 16 and the sheets are located with pins or fasteners. The body 1, comprised of the multi-wall polycarbonate sheet 20 and aluminum sheet 30, with laminated reflective layer 26, is then arched manually, and the end rail tubes 17 are placed in the other opposing end 6 set of tube clamps 19 with the top portions 19b of the tube clamps 19 loosely installed. As the bending occurs, the monolithic aluminum sheet 30 slides on the multi-wall polycarbonate sheet 20 as the top surface of the multi-wall sheet shrinks due to compression. At this point, the induced axial load produces a nonconstant moment distribution along the multi-wall sheet approximating a parabolic curve 100. Once the body 1 has achieved a parabolic curve 100, the body 1 is ready to have edge tape 28 applied to the top surface 2 opposing ends 6 to span over the top of the reflective layer 26 and multi-wall polycarbonate sheet 20 which seals the reflective layer 26, aluminum sheet 30 and multi-wall polycarbonate sheet 20 at the opposing ends 6. The bulkhead 70 of the desired shape produces end moments 101 and downward force on the top surface 2 of the body 1 to further maintain the parabolic shape 100 of the body 1. A first bulkhead 70 is attached to a first chord rail 50. A second bulkhead 70 is attached to a second chord rail 50. Installation of said bulkheads 70 causes the longitudinal rails 15 to further rotate in relation to their respective tube clamps 19 creating bending moments at the opposing ends 6 of the body 1, which alters the moment distribution along the body 1 to better conform to a parabolic curve 100. The tube clamp 19 bolts are then torqued such that the angle of the longitudinal rails 15 becomes fixed. The angles 16 are then removed to apply edge tape 28 spanning over the top of the reflective layer 26 and multi-wall polycarbonate sheet 20 to seal the longitudinal sides of the aluminum sheet 30 to the multiwall sheet 20. The position of the aluminum sheet 30 to the multiwall sheet 20 will remain in place with the angles 16 removed due to the compression force applied by the bulkhead 70. Once edge tape 28 is installed, the angles 16 are secured with fasteners providing high sheer resistance but minimal compression to the sheets of the body 1.

Alternative Reflector.

In an alternative embodiment, the adhesive-backed polymer film reflective layer 26 laminated to the monolithic aluminum sheet 30 is replaced with an approximately 0.032" aluminum reflector sheet such as Alanod's Mico-Sun. As the trough design is scaled-up, the aluminum sheet 30 thickness may be increased to approach 0.050" in large designs.

Trough Use.

The preferred method of tough use is comprised of positioning said troughs in longitudinal strings of four troughs to form one module with the longitudinal sides 8 aligned North to South so that the troughs track the sun as it crosses East to West. It is a specific objective to provide a functional design of a trough that can be manually handled and used as a solar shelter and energy-generating canopy for a camp. A further specific objective is to provide a trough and associated parts where an array can be packed-in by people or animals to a remote region in a densely-packed, disassembled condition and then be assembled on site with minimal tools and technical experience not exceeding that required to assemble IKEA furniture.

In yet another embodiment, the troughs may be individually assembled into an array on existing or purpose-built structures such as a flat or trussed sloped roof. It is another specific objective to provide a parabolic trough solar concentrator that is as small as practically possible so as to have as low a profile to the wind as possible such that a building or structure may not have to be reinforced to accommodate the weight or environmental effects of an array of the parabolic trough solar concentrators described herein.

In yet another embodiment, an individual trough may be erected with an absorber tube to generate hot water or steam, or a tubular container for cooking or other processes as used in known solar cooking devices.

Actuation.

The preferred method of actuation of the preferred embodiments is by joining the longitudinal rails 15 together at the end tubes 17 by split clamps spanning the end tubes of adjacent troughs. A set of ¾" tube clamps are mounted onto the two adjacent chord rails 50 in the center of the module and a pin spans between them to attach a linear actuator which is used to raise and lower that side of the chord rail.

It is understood that the foregoing examples are merely illustrative of the present invention. Certain modifications of the articles and/or methods may be made and still achieve the objectives of the invention. Such modifications are contemplated as within the scope of the claimed invention.

I claim:

1. A Polycarbonate Parabolic Trough Solar Concentrator comprising: a body comprised of a top surface, a bottom surface, two opposing ends, and two opposing longitudinal sides, wherein said body is further comprised of a top layer comprising a flexible reflector sheet, wherein said flexible reflector sheet lays on top of a sheet of multi-walled polycarbonate and said flexible reflector sheet is a specified width less than a specified width of said sheet of multi-walled polycarbonate, and a specified length less than a specified length of said sheet of multi-walled polycarbonate, wherein said reflector sheet moves freely upon said sheet of multi-walled polycarbonate while said body is arced into a parabolic curve and said body is held in a shape of said parabolic curve by a frame.

2. The Polycarbonate Parabolic Trough Solar Concentrator of claim 1, wherein said sheet of multi-walled polycarbonate is curved up to its rated minimum cold-bent radius to achieve said shape of said parabolic curve.

3. The Polycarbonate Parabolic Trough Solar Concentrator of claim 1, wherein said sheet of multi-walled polycarbonate is comprised of a 6 mm twin wall polycarbonate sheet.

4. The Polycarbonate Parabolic Trough Solar Concentrator of claim 1, wherein said sheet of multi-walled polycarbonate is comprised of a 16 mm triple wall polycarbonate sheet.

5. The Polycarbonate Parabolic Trough Solar Concentrator of claim 1, wherein said frame is comprised of opposing longitudinal side chord rails, connected to two opposing end longitudinal rails.

6. The Polycarbonate Parabolic Trough Solar Concentrator of claim 5 wherein a bulkhead is connected to each of said opposing longitudinal side chord rails.

7. The Polycarbonate Parabolic Trough Solar Concentrator of claim 5 wherein said opposing end longitudinal rails are each further comprised of an internal rail tube.

8. The Polycarbonate Parabolic Trough Solar Concentrator of claim 7 wherein said opposing end longitudinal rails are connected to said opposing longitudinal side chord rails by a tube clamp connected to each end top surface of said chord rail, wherein said tube clamp engages an end of said rail tube.

9. The Polycarbonate Parabolic Trough Solar Concentrator of claim 5, wherein a bulkhead is connected to each of said opposing longitudinal side chord rails.

10. The Polycarbonate Parabolic Trough Solar Concentrator of claim 9, wherein said bulkhead is comprised of a plurality of spokes to allow sunlight to pass through said bulkhead.

11. A method of manufacturing a Polycarbonate Parabolic Trough Solar Concentrator comprising the steps of:

a. creating a body of said Polycarbonate Parabolic Trough Solar Concentrator by;

b. cutting a multi-wall polycarbonate sheet to a specified width and a specified length;

C. cutting a reflector sheet to a specified width less than said specified width of said multi-wall polycarbonate sheet, and a specified length less than said specified length of said multi-wall polycarbonate sheet;

d. laying said reflector sheet onto said multi-wall polycarbonate sheet;

e. clamping a first end of said multi wall polycarbonate sheet to a first opposing longitudinal rail of a frame and clamping a second end of said multi-wall polycarbonate sheet to a second opposing longitudinal rail of said frame;

f. arching said body into a parabolic curve, wherein said reflector sheet moves freely upon said multi-wall polycarbonate sheet; and g. fastening said body to said frame.

12. The method of manufacturing a Polycarbonate Parabolic Trough Solar Concentrator of claim 11 wherein said specified width of said multi-wall polycarbonate sheet is approximately 60 inches and said specified length of said multi-wall polycarbonate sheet is approximately 72 inches.

13. The method of manufacturing a Polycarbonate Parabolic Trough Solar Concentrator of claim 12 wherein said specified width of said reflector sheet is 59.5 inches and said specified length of said reflector sheet is 71.5 inches.

14. The method of manufacturing a Polycarbonate Parabolic Trough Solar Concentrator of claim 11 further comprising the step of applying a reflective edge tape to seal said reflector sheet to the first and second ends of said multi-wall polycarbonate sheet.

15. The method of manufacturing a Polycarbonate Parabolic Trough Solar Concentrator of claim 11 further comprising the step of connecting a first bulkhead to a first opposing longitudinal side chord rail of said frame and connecting a second bulkhead to a second opposing longitudinal side chord rail of said frame.

16. The method of manufacturing a Polycarbonate Parabolic Trough Solar Concentrator of claim 11 wherein said reflector sheet is comprised of an adhesive backed reflective film laminated to a top surface of said reflector.

17. The method of manufacturing a Polycarbonate Parabolic Trough Solar Concentrator of claim 11 wherein said multi-wall polycarbonate sheet is pre-drilled to correspond with components of said frame for assembly.

18. The method of manufacturing a Polycarbonate Parabolic Trough Solar Concentrator of claim 11 wherein said body and said frame components can be disassembled and transported in compact, substantially flat containers.

19. The method of manufacturing a Polycarbonate Parabolic Trough Solar Concentrator of claim 11 wherein said reflector sheet is comprised of an aluminum sheet.

* * * * *